(12) United States Patent
Lazarev et al.

(10) Patent No.: US 6,848,897 B2
(45) Date of Patent: Feb. 1, 2005

(54) DEVICE AND METHOD FOR FORMING ANISOTROPIC FILMS

(75) Inventors: Pavel I. Lazarev, Belmont, CA (US); Michael V. Paukshto, San Mateo, CA (US)

(73) Assignee: Optiva, Inc., South San Francisco, CA (US)

( * ) Notice: Subject to any disclaimer, the term of this patent is extended or adjusted under 35 U.S.C. 154(b) by 9 days.

(21) Appl. No.: 10/043,959

(22) Filed: Jan. 8, 2002

(65) Prior Publication Data

US 2002/0093611 A1 Jul. 18, 2002

(30) Foreign Application Priority Data

Jan. 10, 2001 (RU) ......................................... 2001100534

(51) Int. Cl.[7] .............................................. B29D 11/00
(52) U.S. Cl. ...................... 425/224; 264/108; 425/363; 425/373; 425/471; 118/261
(58) Field of Search .......................... 264/108; 425/224, 425/363, 364 R, 373, 404, 470, 471; 118/261

(56) References Cited

U.S. PATENT DOCUMENTS

| | | | |
|---|---|---|---|
| 2,665,450 A | * | 1/1954 | Lindguist ..................... 264/108 |
| 3,235,631 A | | 2/1966 | Shelanski |
| 3,561,841 A | | 2/1971 | Norvaisa et al. |
| 5,739,296 A | | 4/1998 | Gvon et al. |
| 6,049,428 A | * | 4/2000 | Khan et al. .................. 359/491 |

FOREIGN PATENT DOCUMENTS

| | | |
|---|---|---|
| EP | 0 644 439 A1 | 3/1995 |
| EP | 0 834 752 A1 | 4/1998 |
| EP | 0840145 A1 | 5/1998 |
| EP | 1 128 192 A1 | 8/2001 |
| SU | 1232671 A1 | 5/1986 |
| SU | 1490126 A1 | 6/1989 |

OTHER PUBLICATIONS

"Method of the polyethylene–terephthalate film manufacturing", *Abstract*, published Jun. 30, 1989, Bull. #24, (6 pp.).
"Method of the thermoplastic polymer films manufacturing", *Abstract*, published May 23, 1986, Bull. #19, (4 pp.).
Gutoff, Edgar B. et al., "Coating and Drying Defects, Troubleshooting Operating Problems", *SPE* , (74–95).
Mennig, M. et al., "Wet Coating Technologies for Glass", *3rd Int'l Conference on Coatings on Glass*, 2000, (11 pp.).

* cited by examiner

*Primary Examiner*—James P. Mackey
(74) *Attorney, Agent, or Firm*—Dorsey & Whitney LLP

(57) ABSTRACT

This invention pertains to technology of fabricating thin films featuring anisotropic properties such as: optical, magnetic, electric conductivity and others. In particular, this invention is related to devices for obtaining polarizing films from liquid-crystalline solutions of organic materials, for example organic dyes. The disclosed method and device permits the fabrication of anisotropic films from liquid-crystalline solution with high characteristics and high degree of perfection of the oriented structure with significant reproducibility of results. The device makes use of a mechanical element for receiving and guiding the liquid crystal solution onto a substrate and then providing an orienting action to the kinetic elements as they are delivered.

17 Claims, 2 Drawing Sheets a)           b)

DEVICE AND METHOD FOR FORMING ANISOTROPIC FILMS

RELATED APPLICATIONS

This application claims priority to Russian Application Serial No. RU 2001100534 filed Jan. 10, 2001.

FIELD OF THE INVENTION

The invention pertains to technology of fabricating thin films, featuring anisotropic properties, such as: optical, magnetic, electric conductivity, etc. In particular, the invention is directed to devices and methods for obtaining polarizing films from liquid-crystalline (LC) solutions of organic materials, for example organic dyes.

RELATED ART

Currently, optically anisotropic films obtained from LC solutions of organic dyes are widely utilized especially in fabrication of devices for presenting information. (See RU 2155978, Oct. 9, 2000, G 02 B 5/30.) Such films represent thin layers of molecularly ordered organic materials. Flat molecules of the mentioned materials are grouped into orientationally ordered assemblies—supramolecular complexes. The planes of molecules and their dipole moments of optical transition are oriented perpendicular to the axis of macroscopic orientation of the film. In order to create such structure one uses liquid-crystalline state of an organic material solution, in particular—a dye, where molecules already possess local orderliness, while existing in one- or two-dimensional quasi-crystalline aggregates oriented relative to each other. Upon application of such system on the surface of a base and the application of an external orienting action, they assume macroscopic orientation, which in the process of drying not only remains intact, but is also enhanced due to crystallization phenomenon. The polarization axis is directed along the orientation direction coinciding with the direction of application of the polarizer. Peculiarities in the structure of these films necessitate designing special means for their fabrication.

There are various known methods of forming the above-mentioned films and, accordingly, there are various devices for their implementation. See for example U.S. Pat. No. 5,739,296, where application of an LC solution is performed using a drawing slot or a Mayer's rod; the latter may be of knife-like (doctor blade) or cylindrical type. Application of an LC solution on the surface of the substrate may be carried out with simultaneous orientation of the supramolecular complexes in a particular direction. The drying process concludes the fabrication process of these films. However, the known devices do not obtain films having reproducible parameters with a high degree of anisotropy. It is believed that this is due to defects in the molecular structure of the film appearing during its fabrication. Besides that, the fabrication process demands long preparation work to develop particular fabrication conditions for each new batch of raw material.

The fabrication of LC films has not been sufficiently studied. Designers face the tasks of enhancing degree of orientation of the resulting films, increasing reproducibility of their parameters, as well as increasing degree of anisotropy of their properties.

SUMMARY OF THE INVENTION

The present invention relates to a method and device for fabricating anisotropic films from liquid-crystalline solutions of organic or inorganic materials, in particular optically anisotropic films from LC solutions of organic dyes with high degree of anisotropy and high degree of perfection of their structure (crystallinity), with significant reproducibility of results. The device makes use of a mechanical element for additional orienting action and creating rheological conditions to increase the degree of perfection of the film's structure.

Applicability of the herein method and the device is not restricted to formation of optically anisotropic films from LC solution of an organic dye. Some films formed from inorganic lyotropic liquid crystals, for example iron oxohydroxide or vanadium oxide feature anisotropic electrical and magnetic properties.

The choice of conditions for fabricating an anisotropic film is determined depending on the utilized materials: their viscosity, volatility of the solvent, ability of the kinetic units in solution to orient and form a structure. In each particular case one can choose corresponding speeds of translation of the mechanical elements in the device and the rate at which to supply solution, as well as the size of the obtained films and distances between elements in the device.

Technical result of the herein invention is the design of the device and the method of fabricating an anisotropic film from LC solutions of organic or inorganic materials, which enhance perfection of the structure of the obtained films, enhance reproducibility of parameters over the surface of the film as well as through its thickness, and also enhance anisotropy of properties.

Technical result of the invention is achieved by the fact that in the device for fabricating anisotropic films from liquid-crystalline solutions, on at least one substrate there is at least one means for supplying solution(s), at least one means of orienting influence on the solution(s) and/or molecules and/or supramolecular complexes, and at least one means of directing the solution implemented in the shape of a plate(s) installed with a possibility to provide solution supply first onto the inner (relative to the orienting element) side of the plate(s) and then onto the substrate(s); moreover, the above mentioned means are implemented with a possibility of translation relative to the substrate holder(s) and with a possibility to fix them at a desired distance from each other and from the substrate holder(s).

In the herein device, one may provide means of forming several films at the same time from various materials, using different substrate holders.

The plate may be implemented as flat, installed at an angle from 0° to 90° to the plane of the substrate holder. At least a part of the plate may be implemented as a cylindrical surface.

In the direction perpendicular to the direction of the relative translation of the above listed means and the substrate holder(s), dimensions of at least one plate may be larger than dimensions of the substrate holder(s), and/or the traverse dimension of the plate edge situated on the side of the substrate holder may be no less than the traverse dimension of the forming film.

At least a part of the plate surface may possess hydrophilic and/or hydrophobic properties. At least a part of the plate surface may feature a relief. Plate(s) may be made out of a polymer material or rubber or at least two various materials, comprising different parts of the plate(s) and/or comprising different layers of the plate(s).

At least one means of the orienting influence may be implemented as knife-like or cylindrical rod, rotating or not. At least one means of orienting influence contains at least one additional plate, one end of which is fixed so that during relative translation of the additional plate and the substrate holder(s) at least a part of the surface of the additional plate translates freely over the substrate surface immediately after the main means of orienting influence.

At least one means of feeding the solution(s) contains at least one injector for supplying solution(s), and/or at least one system of transmitting rollers, and/or at least one channel with a dosimeter of solution(s) supply.

The surface of at least one orienting means may feature a relief.

The device may additionally be equipped with at least one means for removing the solvent from the forming film, which may be implemented as a heating element and/or an air or gas blower unit, and/or a radiating unit, which may be fixed such as to provide processing of at least a part of the substrate surface.

The device may be additionally equipped with a means of providing static conditions, at least one anti-vibration means, and a system of automatic operation and/or fabrication process control.

Technical result of the method of fabrication of an anisotropic film from liquid-crystalline solutions of organic and/or inorganic materials is achieved by the fact that the method includes supplying solution(s) in the way that solution(s) appears on the surface of the solution-directing element and then on the substrate, where it is subjected to an external orienting action; moreover, during fabrication process, the substrate and the means of supplying the solution, the solution-directing element and the means of orienting action are mutually translated in the plane of the forming film.

After and/or in the process of orienting action the forming film is dried.

The element directing liquid crystalline solution is situated at such distance from the substrate and the orienting element, which would provide laminar flow of solution onto the substrate.

The distance between the means of supply, directing and the orienting elements, as well as the distance between the above mentioned elements and the substrate holder are chosen such as to form a film with the desired thickness on the substrate and to provide laminar flow of liquid-crystalline solution upon the contact with the substrate and further flow of solution onto the substrate.

From the supplying element LC solution is fed to the directing element, where preliminary orientation already takes place. Besides that, mechanical elements of the device are installed at such distances from each other and move at such speeds that the flow of solution fed to the substrate becomes laminar. This promotes orientation of kinetic units (elements of the dispersion phase) in solution and obtaining ordered structure throughout the entire thickness of the film. Absence of turbulence during supply and application of the orienting action to the solution decreases defects in the structure induced by disorientation.

BRIEF DESCRIPTION OF DRAWINGS

The invention will be more clearly understood from the following description when read in conjunction with the drawings in which.

DESCRIPTION OF PREFERRED EMBODIMENTS

Figure 1:
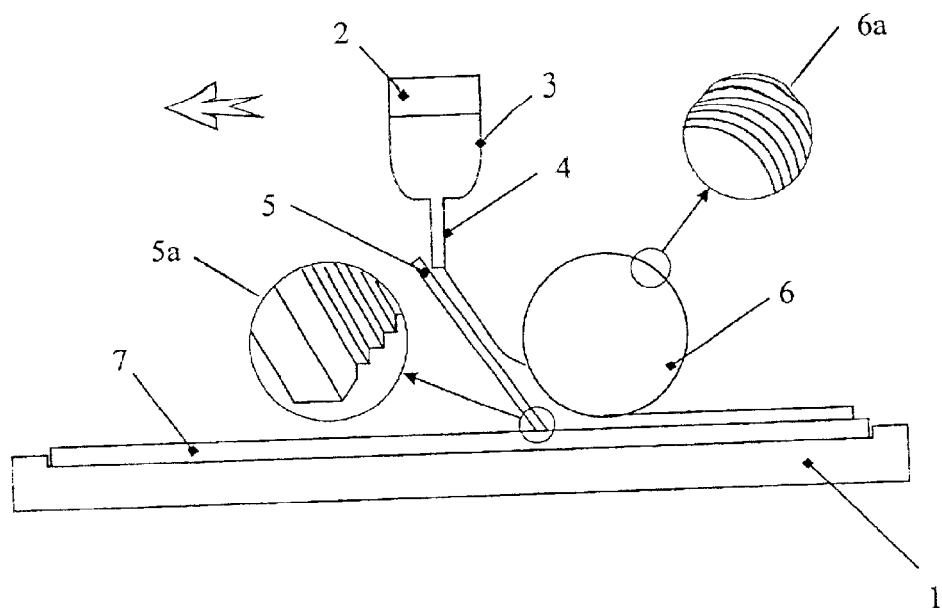
FIG. 1 is a schematic diagram of a device for carrying out the present invention.

The main parts of the device illustrated in the FIG. 1 are: the substrate holder 1; the element for supplying the liquid dispersion system 2 (liquid crystal solution of an organic or inorganic material), implemented as dispenser 3 and channel 4 for delivering the solution; guiding or solution-directing element 5; the element of aligning influence 6, represented by a cylindrical rod. The element 5 may be provided with aligning grooves 5a to initially align the kinetic elements which are further aligned by the aligning element 6 which may also include aligning grooves 6a. A part of the plate or element 5 may include a cylindrical surface (not shown) adjacent the substrate.

Figure 2:
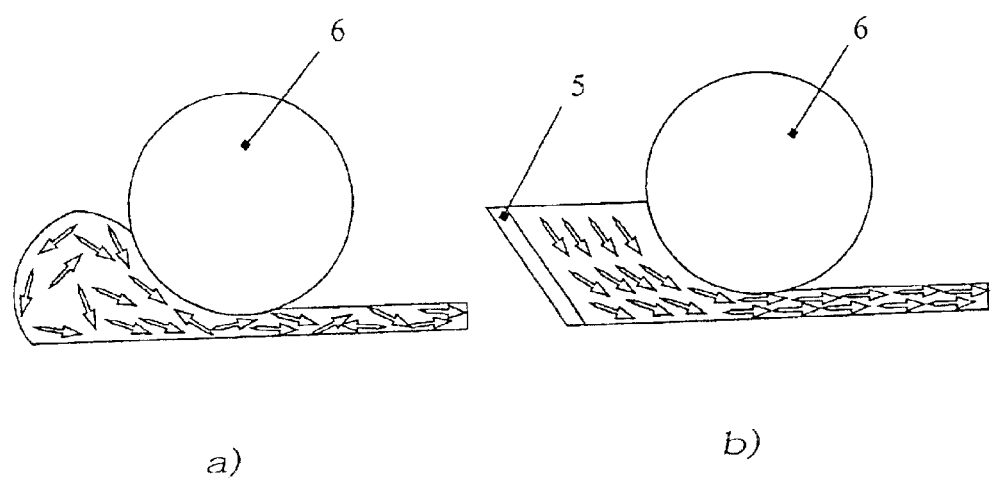
FIGS. 2a and 2b schematically illustrate distribution of the kinetic units in solution (elements of the dispersion phase) during formation of the film: a) in the traditional setup with cylindrical rod, b) according to the disclosed invention, also with cylindrical rod.

During operation of the device, the substrate 7 is placed on the substrate holder 1. The elements 2 and 5 are mounted with the possibility of translating relative to the substrate holder 1 such as to provide delivery of depositing solution over the entire are of the substrate 7 and provide external aligning influence on the kinetic units (elements of the dispersion phase) of the solution, FIG. 2b. Besides that, there is a possibility to mount elements 2 and 5 at the necessary distance from each other and the substrate holder. These distances are chosen such as to provide uniform distribution of the depositing solution over the substrate, to onset laminar flow in the stream of the depositing solution (FIG. 2b), and to provide uniform aligning influence on the kinetic units in the depositing solution throughout the entire thickness of the depositing layer. The mentioned distances and the rate of relative translation of the elements 2, 5 and the substrate holder are determined depending on the viscosity of the solution and the necessary thickness of the forming anisotropic film in each particular case. The mentioned operating parameters of the device are determined experimentally or calculated using known algorithms.

The means of delivering the solution is situated and/or implemented in such a way that the solution is first delivered onto the inner (relative to the aligning element 6) surface of the guiding element 5, and then, under the influence of gravity, free-flows along the guiding element to align the kinetic units and deliver the solution onto the substrate, filling the gap between the elements 5 and 6 over the entire width of the substrate. The edge of the element 5, which delivers solution onto the substrate, is usually positioned parallel to the longitudinal axis of the rod, and, correspondingly, perpendicular to the direction of translation.

However, there may be cases when the mentioned edge of the element 5 and the longitudinal axis of the element 6 are not parallel. This would be necessary to obtain anisotropic films with their characteristics varying over their area. Different distance between the edge of the element 5 and the element 6 along the longitudinal axis of the element 6 will lead to non-uniform flow of the solution onto the substrate and, correspondingly, different aligning influence on the kinetic units in solution in the different regions of the substrate.

Figure 3:
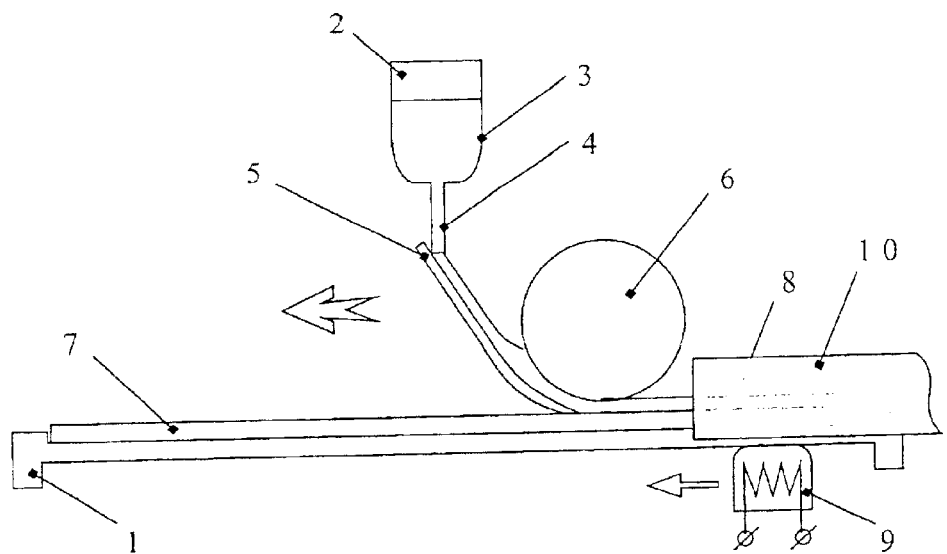
FIG. 3 is a schematic diagram of a device which includes an element for removing the solvent from the forming film, implemented in the form of a heating element.

FIG. 3 illustrates a device, which besides the substrate holder 1, the element for supplying the dispersion system 2, implemented in the form of dispenser 3 and channel 4 for solution delivery, guiding element 5 and aligning element 6, contains the element for removing the solvent from the forming film 8, implemented in the form of a heating element 9. The device may additionally contain lid 10, which provides static conditions of the drying process (removing the solvent from the forming film). Simultaneous use of elements 9 and 10 allows providing optimum conditions for fabricating anisotropic films and consistently fabricate films with high optical characteristics.

Figure 4:
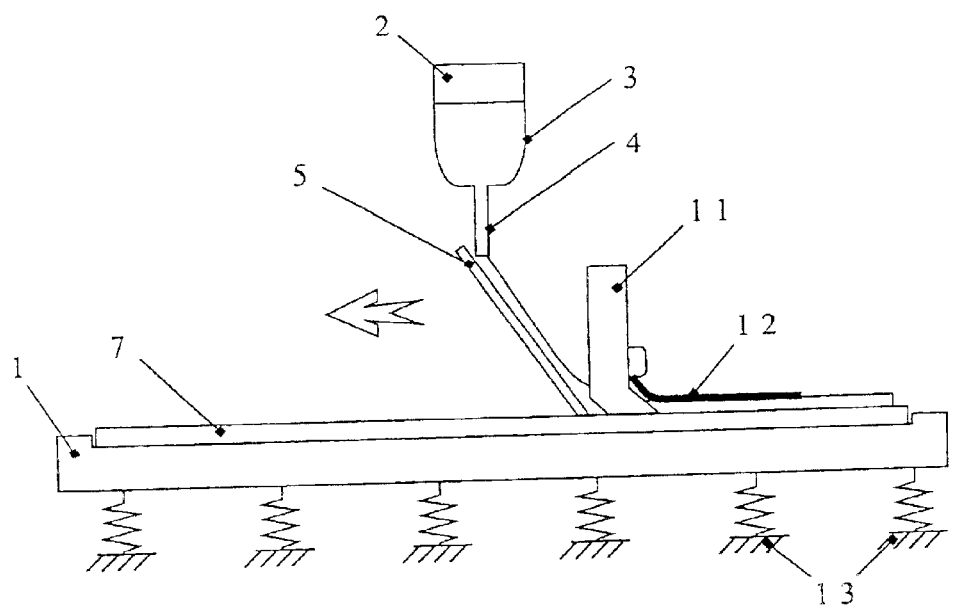
FIG. 4 is a schematic diagram of a device, wherein the function of the element of the aligning influence is performed by a knife-like blade.

FIG. 4 illustrates a device, wherein the function of the element of the aligning influence is performed by a knife-like blade 11. The element of the aligning influence also comprises one flexible plate 12, one end of which is fixed in such a way that during relative translation of the additional plate 12 and the substrate holder 1, a part of the surface of the additional plate is freely moving over the surface of the substrate 7 right after the main element of aligning influence 11. The role of this plate is to perform additional aligning influence on the forming film in the process of removing the solvent, which improves its optical characteristics and increases consistency of parameters over the entire surface of the film. Good results may be obtained when using anti-vibrational elements 13 within the device, which stabilize conditions of deposition and fabrication of the film.

An example of implementation of the method of fabrication of an optically anisotropic film is described. The original material for obtaining optically anisotropic film is aqueous LC solution of sulfonated indanthrone. The dye concentration in the lyotropic LC (LLC) is 7.0 wt. %. Mayer's rod #4 works as the external orienting element, represented by a cylinder wound with a wire, which provides the thickness of the wet layer 9.5 $\mu$m. The means of supplying LLC appears as a flat plate, installed at an angle of 60° to the plane of the substrate. The distance between the elements 3 and 4 is 2 mm. The speed of movement of the elements 3 and 4 relative to the substrate is 12.5 mm/sec. After application of LLC, orientating and drying one obtains a film 0.3–0.4 $\mu$m thick, with optical characteristics $K_d$=25 at T=40%, i.e. better compared to the traditionally obtained with such systems $K_d$=20–22 at T=40%. ($K_d$—dichroic ratio).

Thus, the suggested method and device for its implementation open new possibilities of obtaining films possessing anisotropic properties (optical, magnetic and other) and perfect structure. Via using the declared invention, one obtains a film with a more perfect structure (and as a consequence, with higher anisotropy of properties) than via analogous methods (in analogous conditions) without using the directing element of the declared design. The presented example does not exhaust all possible uses of the declared invention. One can obtain separate films on different substrate holders, as well as one or several films even with different characteristics on a single substrate holder. The declared device and the method may be used as an independent unit or an operation in any technological line of fabricating anisotropic films. Good results are obtained by using the device with anti-vibration and other facilities, which stabilize application conditions. Besides that, it is recommended to use means of automatic operating and control, especially with computer operation of the process.

What is claimed is:

1. A device for fabricating anisotropic films from a liquid crystal solution of organic and/or inorganic materials on at least one substrate, comprising:

at least one means of supplying said liquid crystal solution, a first means providing orienting action to the solution and/or molecules and/or supramolecular complexes of said solution, at least one solution-directing element implemented as a plate for receiving the solution onto the substrate at said first means for providing orienting action to the solution, and means for providing relative movement between said substrate and said first means and said solution-directing element.

2. A device according to the claim 1, wherein the plate is flat and installed at an angle from 0° to 90° to the plane of the substrate.

3. A device according to the claim 1, wherein at least a part of the plate includes a cylindrical surface.

4. A device according to any of claims 1, 2 and 3, wherein in the direction that is perpendicular to the direction of relative movement the dimensions of the plate are larger than the dimensions of the width of the film.

5. A device according to any of claims 1, 2 and 3, wherein at least a part of the plate possesses hydrophilic or hydrophobic properties.

6. A device according to any of claims 1, 2 and 3, wherein at least a part of the plate surface features a relief.

7. A device according to any of claims 1, 2 and 3, wherein the plate is made out of a polymer material.

8. A device according to any of claims 1, 2 and 3 wherein the plate is made of rubber.

9. A device according to any of claims 1, 2 and 3 wherein the plate is made of two different materials.

10. A device according to any of claims 1, 2 and 3, wherein the first means providing orienting action comprises a cylindrical rod or roller or doctor blade.

11. A device according to claim 10, wherein the device further comprises an additional means providing orienting action comprising at least one plate, one end of which is fixed such that during motion of the plate of the additional means relative to the substrate at least a part of the surface of the plate of the additional means is freely translating over the substrate surface immediately after the first means providing orienting action.

12. A device according to any of claims 1, 2 and 3, wherein the surface of said first means providing orienting action includes a surface relief.

13. A device according to any of claims 1, 2 and 3, wherein the device additionally comprises means for removing solvent from the film.

14. A device according to the claim 13, wherein the means for removing solvent from the film is implemented as a heating element and/or a radiating unit installed such as to provide processing of at least a part of the substrate surface.

15. A device as in claim 13 wherein the means for removing solvent from the film is implemented as a blower.

16. A device as in claim 13 wherein the means for removing solvent from the film is implemented as a radiating unit.

17. A device according to any of claims 1, 2 and 3, wherein the device is additionally equipped with at least one anti-vibration means.

* * * * *